March 18, 1969  MASAO KANDA  3,433,111

PIN PLATE FOR A PIANO

Filed March 3, 1967

United States Patent Office 3,433,111
Patented Mar. 18, 1969

3,433,111
PIN PLATE FOR A PIANO
Masao Kanda, Hamamatsu-shi, Japan, assignor to Shigeru Kawai, Hamamatsu-shi, Shizuoka-ken, Japan
Filed Mar. 3, 1967, Ser. No. 620,371
Claims priority, application Japan, Mar. 4, 1966, 41/12,847
U.S. Cl. 84—188    8 Claims
Int. Cl. G01c 3/04, 3/06

ABSTRACT OF THE DISCLOSURE

A material for the pin plate of a piano constituted by a thermosetting synthetic resin in which are uniformly dispersed small wood chips as a filling agent. The ratio by weight of the resin and wood chips is between 100:20 and 100:150. Optionally added is one or both of an extending agent and a reinforcing agent.

Brief summary of the invention

This invention is concerned with the composition of pin plates of pianos, and particularly with a composition which is substantially unaffected by humidity variations.

It is an object of the invention to provide a piano pin plate of suitable composition so that it has all the necessary pin support properties and yet is unaffected by humidity variations for the life of the pin plate.

In accordance with the invention, a pin plate for a piano is produced by mixing a thermosetting synthetic resin and wood chips so that the latter are uniformly dispersed in the resin. The ratio by weight of the resin and wood chips is between 100:20 to and 100:150. The mixture is then charged into a mold and formed therein as a pin plate for a piano. Optionally, one or both of an extending agent and a reinforcing agent can be added to the mixture.

Detailed description of the invention

Figure 1:
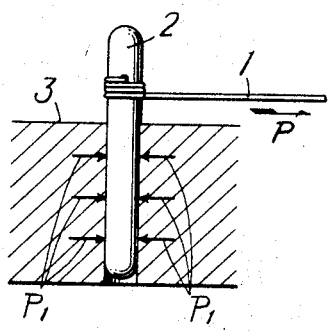
FIGURE 1 is a view partly in section of a pin plate of a piano showing a tuning pin therein.

Pin plates for pianos have generally been constructed of maple. The reason therefor is that maple is an excellent wood for a piano pin plate when considering factors such as strength, economy and manufacture.

Wood, however, is affected by changes in humidity and undergoes expansion and contraction. This is a great deficiency for a piano pin plate as will be described hereinafter. The present invention contemplates removal of this deficiency and proposes an almost ideal synthetic plate for a pin plate.

The relation between a piano pin plate and a tuning pin and the required properties for a pin plate will now be explained with reference to the drawing.

Figure 2:
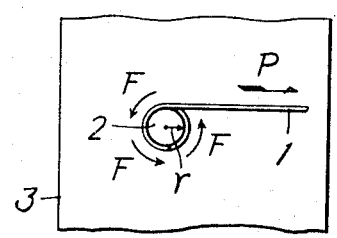
FIGURE 2 is a plan view of the arrangement shown in FIG. 1.

Referring to FIG. 1, a tuning pin 2 set in a pin plate 3 is always subjected to a force in a predetermined direction by the tension force P in a string 1. In order that pin 2 is securely supported or held by the pin plate 3 against the force P, a securing force greater than a predetermined value is required. This securing force is produced by the algebraic sum of the pressures $P_1$ of the pin plate 3 exereted on each unit area of the pin 2, and the securing force is required to be larger than the tension force of the string 1. This means that the material of the pin plate 3 must have a hardness (strength) sufficient to resist the compression produced by the tension force P of the string. Additionally, the pin 2 is subjected to a twisting moment of the magnitude $P \times r$, which is the product of the tension force P of the string 1 and the radius $r$ of the pin 2 as shown in FIG. 2. The pin must be held in a predetermined angular position against this force without any turning movement. For this purpose, the collective force F of the friction forces exerted on each unit area between the pin plate 3 and the pin 2 must be larger than the abovementioned twisting moment. This collective frictional force F is determined by the magnitude of the pressure $P_1$ which the pin 2 can develop in the plate and the coefficient of friction between the pin plate 3 and the pin 2. Consequently, if the pin 2 is to be fixed in a predetermined position the force F can be made large by changing the shape of the pin or by increasing the difference between the outer diameter of the pin and the diameter of a preparatory pin hole for the pin. In practice, however, the pin 2 is first driven into the pin plate 3 by an air hammer or the like and then is forcibly turned several times for stringing, tuning or the like. Accordingly, the pin plate is required to have the property that a turning movement can be effected smoothly and the frictional force F developed is larger than a predetermined definite value. Moreover, this force F must be maintained even after a repeated turning operation of the pin. Thus the pin must be circular in section and the difference between the outer diameter of the pin and the inner diameter of the preparatory pin hole cannot be larger than a predetermined value. From these conditions, the pin must not only have sufficient hardness (strength), but it must be of suitable elasticity.

This elasticity is required also for the following reason. A tuning pin is usually 7 mm. in diameter and such pins are driven into preparatory holes with a pitch of 14 to 20 mm. between centers. In order to obtain a sufficient holding force, the pin outer diameter and the preparatory pin hole diameter are so designed that the pin is larger than the hole by a difference within a predetermined range. If, in this case, the pin plate is high in hardness alone, there is a danger that cracks can occur about the periphery of the hole or in the space extending between the adjacent holes, because the spacing of the pins is comparatively low in comparison with the pin outer diameter. A proper degree of elasticity is necessary also for the pin in order to prevent such cracks.

As for the requirement for an age change, a piano has a comparatively long life so that during this period the holding force P, the frictional force F and others must always be maintained above the necessary predetermined values. The conventional pin plate has such a change with age whereby the pin hole repeats its expansion and contraction due to the change in humidity and there is caused pin looseness, which is a very severe defect for a pin plate.

The present invention provides an almost ideal pin plate which possesses almost completely the necessary properties for a pin plate for a piano to completely eliminate the defects in the conventional pin plate, for the life of the piano.

A conventional pin plate of maple material satisfies to a certain extent the characteristic features necessary for a pin plate as mentioned above, under ideal humidity conditions, but the pin is not satisfactory under changing humidity conditions, that is, in its generally used condition. Namely, a maple pin plate contracts as the humidity is lowered, and thereby the pin hole is increased in diameter, so that the friction between the pin and the pin hole is decreased resulting in pin looseness. In the case when the humidity increases, the pin plate expands and the pin hole becomes smaller in diameter to press the pin with increasing pressure at the outer periphery thereof, so that when such pressure is severe or repeated the plate portion adjacent the pin cracks and accordingly the securing force is lowered to cause similarly pin looseness. In this way, changes in humidity prove to be an unavoidable and severe deficiency for wood material, and various methods of improvement have been proposed to overcome this deficiency. Such known methods are as follows:

(1) Making the pin plate from plastic material to eliminate the influence by humidity. However, such a plate cannot satisfy at the same time both the hardness (strength) and elasticity requirements for pin plates.

(2) Making the pin plate of metal. This is not satisfactory since turning of the pin cannot be made smoothly. The metal plate also is deficient in failing to maintain the pin frictional force after repeated turning of the pin.

(3) Painting a wood pin plate to protect the plate against humidity changes. The paint serves a dampproofing effect for a short time but such effect decreases with the lapse of long periods of time.

(4) Making a pin plate of plywood in which wood sheets are adhered in layers by an adhesive agent. This is a comparatively suitable solution but the resulting plate is extremely expensive and troublesome in its manufacturing process, and therefore is impractical.

The present invention provides an ideal pin plate for a piano which is free from the above deficiencies of the conventional pin plate and possesses suitable hardness (strength) and elasticity while its retaining force for a pin is not influenced by changes in humidity. According to the present invention, a thermosetting synthetic resin such as an unsaturated polyester resin, a phenol resin, an epoxy resin or the like is used as the principal agent, and wood in small pieces is used as a filling agent, these agents being mixed and agitated at the rate by weight of from 100:20 to 100:150 and then molded. When occasion demands, an extending agent such as wood powder or the like or a reinforcing agent such as glass fiber, or both may be added to be simultaneously mixed and agitated with the principal agent and the filling agent and the mixture may be compression molded. The extending agent is used for the purpose of making the product less expensive and the reinforcing agent is to improve the compression and tensile strength of the product. The plate of the invention can meet all requirements for a pin plate and can be produced at a practical price even if the above-mentioned extending agent and the reinforcing agent are not used.

The invention will now be explained in greater detail as follows:

The mixing ratio by weight of the principal agent and the filling agent is from 100:20 to 100:150 as mentioned before. The respective materials prepared in the foregoing ratio are mixed and sufficiently agitated to obtain a uniform mixture, and then the mixture is charged in a mold previously prepared and is subjected to a compression molding. In the case when the mixture is obtained in a fluid state, the compression stage is sometimes unnecessary. Depending on the kind of synthetic resins, a hardening agent is suitably used or a heat compression is sometimes required.

The purpose of the small pieces of wood as the filling agent is to obtain the necessary elasticity for the pin plate, and the wood pieces are required to be of such size that the same are not reduced to powder when agitated with synthetic resin. Generally, such pieces are 0.1–0.8 mm. in thickness, 1.5–6.0 mm. in width and 10–25 mm. in length. Such pieces are generally called wood chips and they are formed with their grain in the longitudinal direction. Such chips are available in quantity and are very inexpensive.

The reason for defining the size and the nature of the chips as mentioned above is that the necessary elasticity for a pin plate cannot be obtained if wooden pieces of smaller size are used as the filling agent.

In the light of the purpose of the extending agent, there may be used inexpensive wood powder which is readily available and can be easily mixed. As for the reinforcing agent, there can be used fibrous material which is high in tensile strength such as for instance glass fiber, cotton fiber or the like. Glass fiber is most suitable for this purpose and it is well known that it is commonly used as the reinforcing agent for synthetic resin. If this extending agent or the reinforcing agent or both of them are added in proper amounts depending on the purpose, there may be obtained a pin plate having a proper hardness and elasticity at an advantageous economical price.

The limitation of the amounts will now be explained as follows:

The mixing ratio by weight of the principal agent, that is, the thermosetting synthetic resin and the filling agent, e.g. the small wood pieces is within the range of 100:20 to 100:150. If this ratio is larger than 100:20, the property of the synthetic resin is too pronounced and the hardness becomes too high, so that a crack is often produced when a pin is driven into the pin plate and the frictional force is lowered when the pin is subjected to repeated turning operations. Thus, such a ratio is not proper for a pin plate. If, on the other hand, the mixing ratio is smaller than 100:150, the property of the filling agent is too pronounced and the hardness (strength), the elasticity, and the sensitivity to humidity are unsuitable for a pin plate. In the case where the extending agent is added, the amount thereof must be less than the principal agent. If a larger amount is added, the hardness (strength) of the pin plate is reduced, resulting in an unsuitable pin plate. The reinforcing agent is to be used also in an amount less than the principal agent. Any agent which cannot provide the necessary strength for a pin plate in the quantity within the above range, is not suitable as the reinforcing agent, and any agent usable as the reinforcing agent is generally expensive, and therefore use of larger quantity thereof is not practical. It should be noted that in the present invention the fixed mixing ratio of the principal agent and the filling agent is fully usable even if the extending agent, the reinforcing agent or the like is not added, as mentioned above.

The pin plate of the present invention is formed by selectively mixing the above agent within respective limited amounts based on the required strength, elasticity and economy or others, and the mixture is then molded. The characteristic features thereof may be listed as follows:

(1) The principal agent of the synthetic resin is capable of sealing the filling agent, so that there will be no substantial humidity influence as a whole on the pin plate and any consideration of such influence can be ignored for the life of the pin plate.

(2) Since synthetic resin is mixed with wood material of a particular size a product is obtained with properties of hardness and elasticity suitable for a pin plate.

(3) For the same reason, the pin neither creaks nor jumps. Thusly, the adjustment of the string tension force can be carried out smoothly.

From these characteristic features, the pin plate of the present invention is such an ideal pin plate whereby the holding force for a pin is easily obtained, and the necessary strength of the holding force can be maintained without any influence by humidity for a long period even when repeated turning operations are carried out during such period.

The present invention will be explained with reference to some embodying examples, wherein soft polyester resin is used as the principal agent and wood pieces are used as the filling agent, and the mixing ratio by weight, the shape and the size thereof are as shown below: (The pin plates are two kinds designated No. 1 and No. 2.)

| Material | Nature | No. 1 (grs.) | No. 2 (grs.) |
| --- | --- | --- | --- |
| Soft polyester resin. | Pulpy liquid state, specific weight, 1.0-1.2; viscosity 5.5 poise/20° C. | 250 | 250 |
| Beech material small pieces. | 0.3-0.7 mm. in thickness, 1.5-2.0 mm. in width, 20-25 mm. in length. | 150 | 200 |

Figure 3:
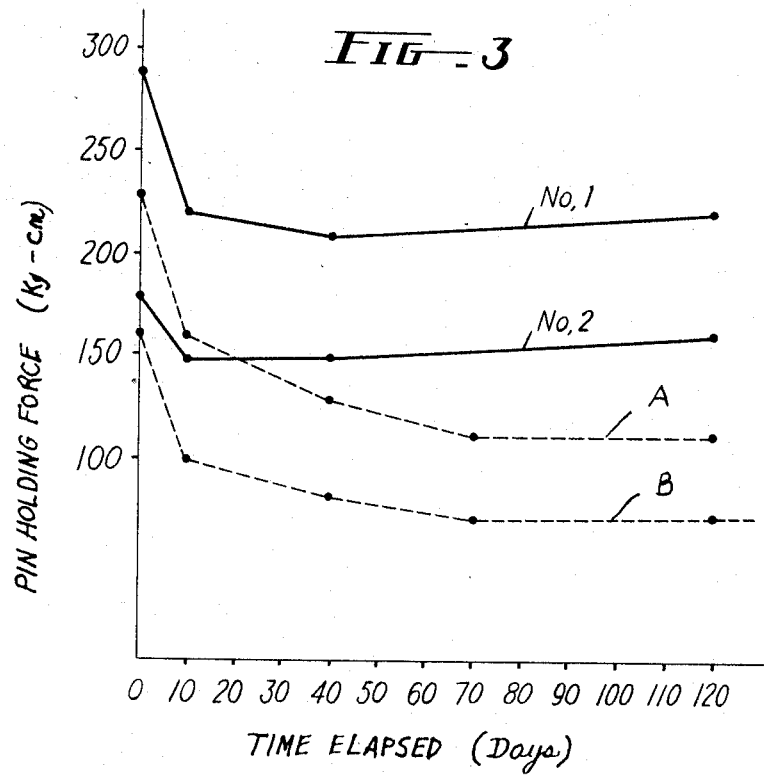
FIG. 3 is a graphical illustration of a comparison between the holding force for a tuning pin of a pin plate according to the invention and that of a conventional pin plate.

In both the case No. 1 and No. 2, the materials are fully mixed and agitated and then are charged into a mold to be completely by compression under a pressure of 15 kgs./cm.$^2$. Either of samples No. 1 and No. 2 has a hardness (strength) sufficient to resist the string tension force, that is, the compression elastic limit in the direction of $P_1$ in FIG. 1 is an average value of 14,000 kg./cm.$^2$. This is more than 50% greater than that in the same direction of a conventional plywood pin plate of from there to five maple material layers. The quantity of maple material is not uniform but usually varies whereas the pin plate of the present invention is characterized in that it can be obtained with qualitatively uniform properties without any unevenness in quantity. This high compression elastic limit shows that theoretically the pin holding force $P_1$ of the pin plate is more than 50% larger than that of a pin plate of maple material. Next, in respect to the maintenance feature of the frictional force resistable to the turning moment ($P \times r$), the pin plates according to this invention are compared with the conventional maple pin plates. The result thereof is shown in FIG. 3. Therein are shown the results obtained in the case where the pin plates are manufactured in a room having an equilibrium moisture content of 10% and are left for a long period in a room having an equilibrium moisture content of 5%, and the pins are all 6.9 mm. in outer diameter, and the diameter of a drill for making a pin hole in 6.2 mm. in the case of No. 1 and maple material A, and the drill is 6.3 mm. in the case of No. 2 and maple material B. This humidity in the manufacturing room and the difference between the diameters of the pin and the drill are the most popular conditions. Additionally, the equilibrium moisture content of 5% is a condition in a heated room in winter in Japan or in dry zones such as in the United States. This is a dry condition which causes pin looseness in the conventional pin plate within a comparatively short period. As is clear from the diagram in FIG. 3, the lowering of the holding force is large for around the initial 10 days. This is based on the fact that the frictional force is lowered with the progress of mechanical breakage at the portion in close contact with the periphery of the pin. As regards the subsequent change, there is scarcely a change in the holding force in either of No. 1 and No. 2 of the present invention. On the contrary, the holding force of each of the pin plates A and B of maple material continues lowering and is lowered to 70-110 kgs./cm. after 70 days. Judging from this, it can be said that the pin holes of the pin plates of the invention undergo no change in shape. On the contrary, it is shown that the holding force of each of the maple pin plates A and B continues lowering with time even after the unavoidable initial lowering. That the initial and the subsequent holding forces in the case where the drill diameter is 6.3 mm. are small in comparison with those in the case where the drill diameter is 6.2 mm. in both the cases of the pin plates of the present invention and the conventional pin plates is natural from the fact that the frictional force becomes small. Generally, the limiting value of torque not causing pin looseness against the string tension force is near 40 kg./cm. However, in order that the pin may be firmly fixed at any desired position at the time of tuning and any pin looseness may not be caused for the longest possible period after the tuning, it is generally required that the holding force for the pin be 100 to 150 kg./cm. The pin plate of the present invention satisfies this condition as shown in FIG. 3, but the holding force of the conventional maple pin plate is almost the limit required or below the limit, and accordingly the same is unsuitable for the pin plate. It can be considered theoretically possible that the holding force at about 120 days of the conventional pin plate be kept above 150 kg./cm. by increasing the difference between the pin outer diameter and the pin hole diameter. With this method, however, in practice an extremely large force is required for the pin driving operation and the pin plate is often cracked.

Additionally, in the case where the previous pin hole diameter is small, a new cracking is sometimes caused at the portion between the pin plate and the periphery of the pin when humidity is increased. This makes the holding force unstable and the holding force becomes greatly reduced under repeated changes in humidity.

From the above explanation and conditions, it can be understood that the conventional maple pin plate is not satisfactory, and in comparison therewith, the pin plate according to the present invention possesses such excellent characteristic features that the holding force of 150 to 160 kg./cm. can be stably maintained for long periods even under the conditions in which the pin diameter is 6.9 mm. and the pin hole drill diameter is 6.3 mms. Under these conditions, the plate B of maple is unsuitable. When the same holding force is desired, the pin plate according to the present invention affords great tolerance in the size of the drilled hole and in the accuracy of the drill outer diameter in comparison with the case of the conventional maple pin plate. For obtaining the same holding force, it is possible to make the difference between the pin outer diameter and the pin hole diameter small, and this makes extremely advantageous the working operation, for example, by facilitating the pin driving operation. Thus, the present invention provides an ideal pin plate having vastly superior features. The price thereof at the present stage is only 30 to 40% higher than the conventional one, and this is not significant when viewed from the total price of a piano and the excellent features afforded as mentionel above. The plate according to the invention can be covered or placed in layers with conventional maple sheets or other material from an appearance or economic point of view.

What is claimed is:

1. An article of manufacture comprising a pin plate for a piano constituted by a thermo setting synthetic resin and small wood chips dispersed uniformly therein as a filling agent, the resin and wood chips being present in a ratio by weight of between 100:20 and 100:150, said pin plate being substantially resistant to humidity variations.

2. An article as claimed in claim 1 comprising an extending agent dispersed in the resin.

3. An article as claimed in claim 2 wherein said extending agent is wood powder.

4. An article as claimed in claim 1 comprising a reinforcing agent in said resin.

5. An article as claimed in claim 4 wherein said reinforcing agent is glass fiber or cotton fiber.

6. An article as claimed in claim 2 wherein said extending agent is present in an operative amount less than that of the resin.

7. An article as claimed in claim 4 wherein said reinforcing agent is present in an operative amount less than that of the resin.

8. An article as claimed in claim 1 wherein said wood chips are between 0.1 and 0.8 mm. in thickness, 1.5 and 6.0 mm. in width, and 10 and 25 mm. in length.

References Cited

UNITED STATES PATENTS 3,027,338  3/1962  Chetakian _____ 260—9

FOREIGN PATENTS 257,266  9/1963  Australia.

RICHARD B. WILKINSON, *Primary Examiner.*

L. R. FRANKLIN, *Assistant Examiner.*

U.S. Cl. X.R.

260—9; 84—452